(12) United States Patent
Omar

(10) Patent No.: US 8,072,977 B2
(45) Date of Patent: Dec. 6, 2011

(54) SYSTEM AND METHOD FOR MANAGING NETWORK RESOURCES AND POLICIES IN A MULTICAST ENVIRONMENT

(75) Inventor: Hassan M. Omar, Mt Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 12/411,485

(22) Filed: Mar. 26, 2009

(65) Prior Publication Data

US 2010/0246394 A1    Sep. 30, 2010

(51) Int. Cl.
*H04L 12/26* (2006.01)
*H04J 1/16* (2006.01)
*G08C 15/00* (2006.01)
*G06F 11/00* (2006.01)
*G01R 31/06* (2006.01)

(52) U.S. Cl. ......... 370/390; 370/230; 370/312; 370/329

(58) Field of Classification Search .......... 370/230–242, 370/312–329, 390–419; 455/452–509; 709/224–227
See application file for complete search history.

(56) References Cited

U.S. PATENT DOCUMENTS

| 7,496,061 | B2* | 2/2009 | Oswal et al. | 370/312 |
|---|---|---|---|---|
| 7,746,799 | B2* | 6/2010 | Kokot et al. | 370/252 |
| 2004/0029591 | A1* | 2/2004 | Chapman et al. | 455/452.1 |
| 2005/0111474 | A1* | 5/2005 | Kobayashi | 370/432 |
| 2005/0128951 | A1* | 6/2005 | Chawla et al. | 370/235 |
| 2007/0280108 | A1* | 12/2007 | Sakurai | 370/232 |
| 2007/0280232 | A1* | 12/2007 | Dec et al. | 370/390 |
| 2008/0155612 | A1* | 6/2008 | Ikeda et al. | 725/87 |
| 2009/0279701 | A1* | 11/2009 | Moisand et al. | 380/270 |
| 2010/0027542 | A1* | 2/2010 | Huang et al. | 370/390 |
| 2010/0061368 | A1* | 3/2010 | Garofalo | 370/390 |
| 2010/0080161 | A1* | 4/2010 | Hayashi | 370/312 |

* cited by examiner

*Primary Examiner* — M. Phan

(57) ABSTRACT

An approach is provided for managing network resources and policies. A network resource manager receives an allocation request, over a radio network, for one or more network resources for joining one of a plurality of multicast groups, the one mutlicast group being associated with a quality of service (QoS) level. The network resource manager then determines whether the network can accommodate the allocation request and modifies the network to accommodate the allocation request based on the determination by modifying a local multicast service provider (LMSP) mapping list that associates, respectively, one or more LMSPs with the multicast groups.

15 Claims, 12 Drawing Sheets

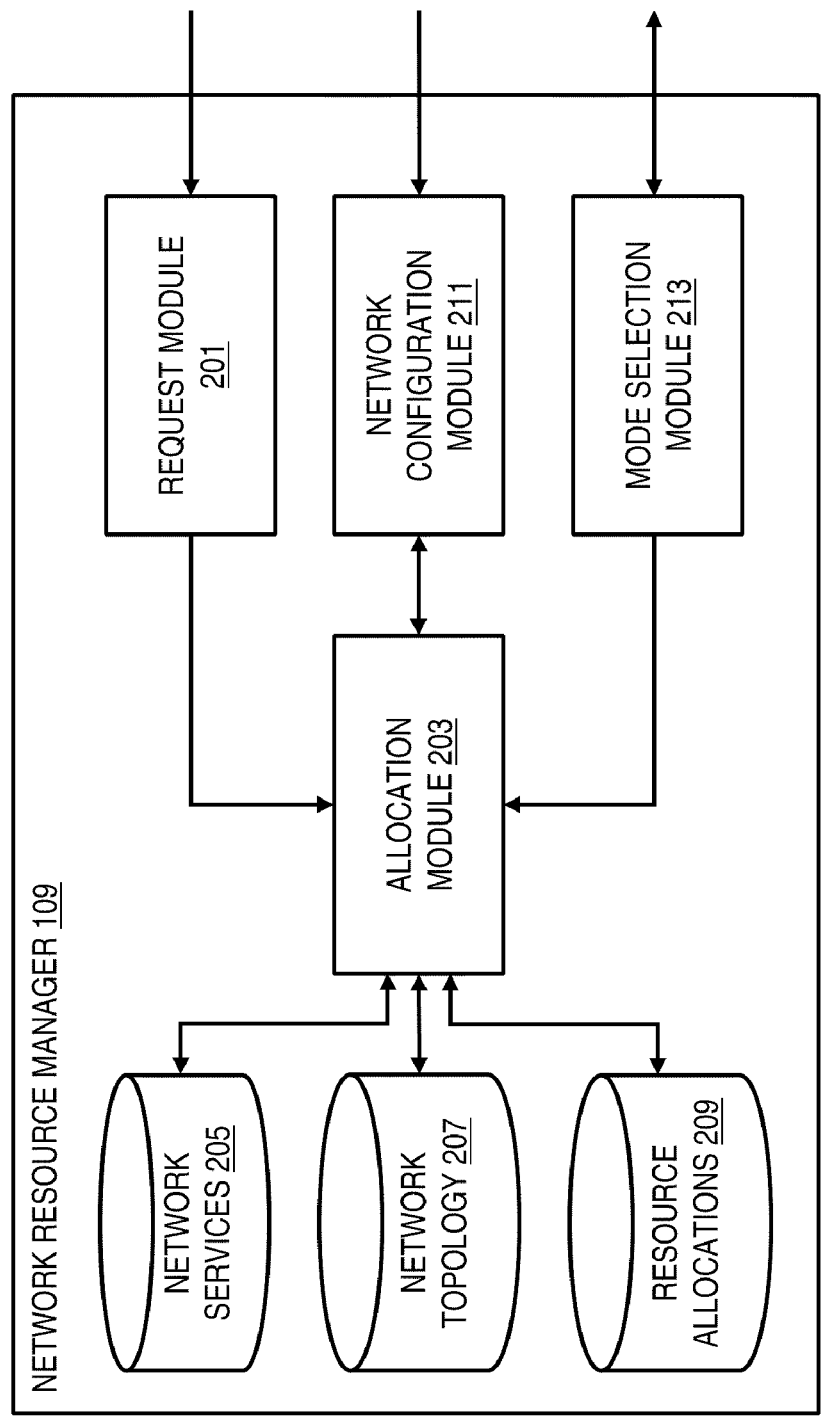

SYSTEM AND METHOD FOR MANAGING NETWORK RESOURCES AND POLICIES IN A MULTICAST ENVIRONMENT

BACKGROUND INFORMATION

Communications service providers are continually challenged to develop new services and applications (e.g., Internet protocol television (IPTV), audio conferencing, video conferencing, content distribution, etc.) to remain competitive and develop new sources of revenue. Customers have also come to expect that these new services and applications will be available to mobile users. However, implementation of these services and applications in a mobile environment can be problematic because of the difficulty of maintaining the quality of service (QoS) levels required for the network traffic components (e.g., voice, video, and data) associated with these new services and applications, particularly when potential users are on the move or using different access technologies. Moreover, in a mobile environment, it is likely that network traffic for these services and applications are transported over multiple networks that belong to different carriers and/or service providers, adding to the overall complexity of the problem.

Therefore, there is a need for an approach that provides for robust and real-time management of network resources and policies to assist in delivering services and applications at predetermined QoS levels.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2 is a diagram of the components of network resource manager, according to an exemplary embodiment;

DESCRIPTION OF THE PREFERRED EMBODIMENT

A preferred apparatus, method, and system for managing network resources and policies are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Various exemplary embodiments are described with respect to managing network resources and policies in a mobile wireless network environment for delivery of multicast services, applications, and content (e.g., Internet protocol television (IPTV), audio conferencing, video conference, content distribution, webcasting, distance learning applications, and other similar services). However, it is contemplated that the approach described herein may be used within any type of communication system or network and on either mobile or stationary devices. It is further contemplated that the approach may be used for delivery of any services, applications, and/or content delivered over the communication system or network.

Figure 1:
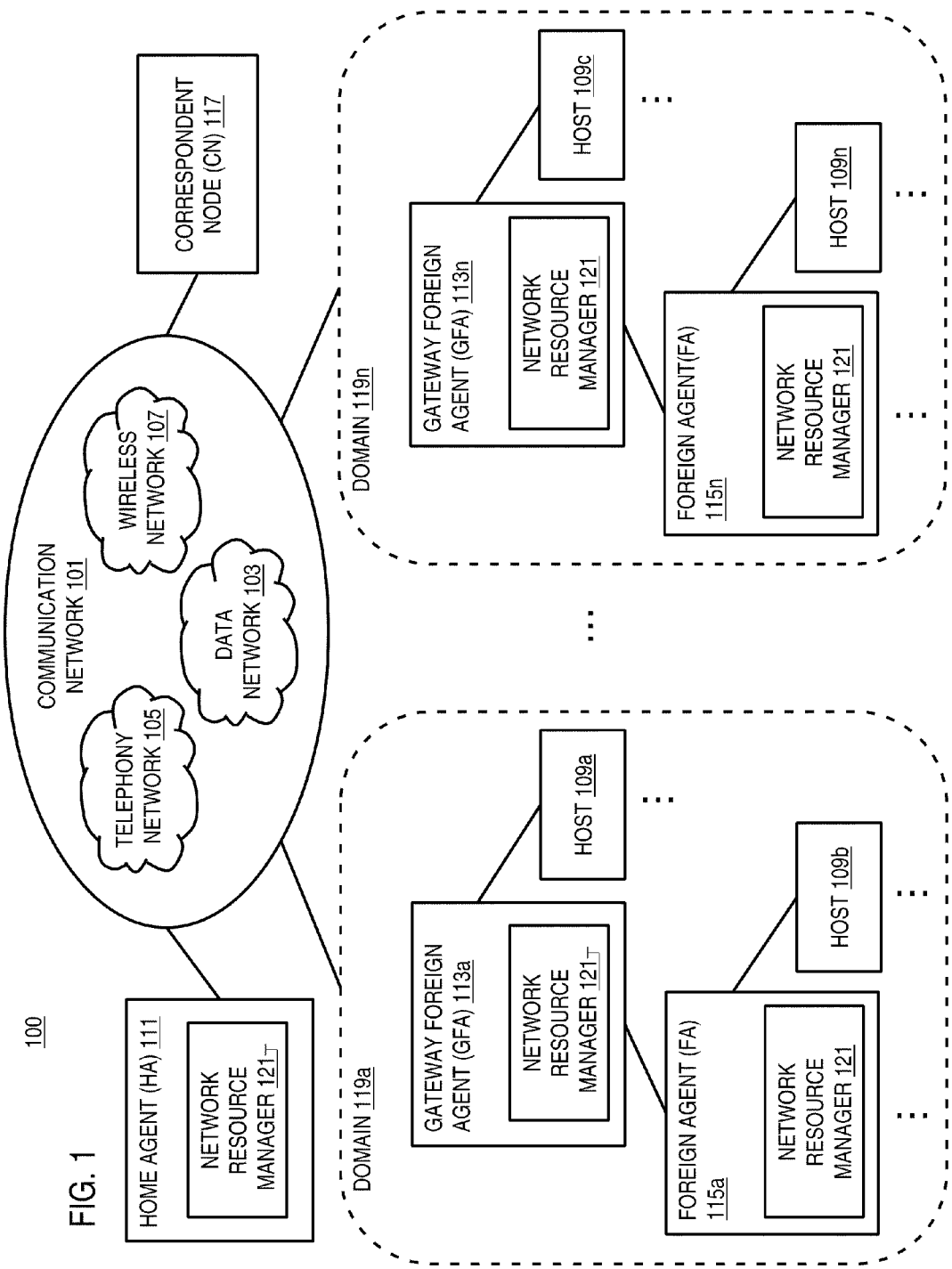
FIG. 1 is a diagram of a system capable of managing network resources and policies, according to an exemplary embodiment.

FIG. 1 is a diagram of a system capable of managing network resources and policies, according to an exemplary embodiment. For the purposes of illustration, a mechanism for managing network resources and policies is described with respect to a system 100 that includes a communication network 101 including a including a data network 103, telephony network 105, and wireless networks 107. It is contemplated that the data network 103 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. The telephony network 105 may include a public switched telephone network (PSTN) or equivalent. It is also contemplated that the wireless network 107 may be, for example, a cellular network and may employ various technologies including, for example, code division multiple access (CDMA), enhanced data rates for global evolution (EDGE), general packet radio service (GPRS), global system for mobile communications (GSM), universal mobile telecommunications system (UMTS), etc., as well as any other suitable wireless medium, e.g., microwave access (WiMAX), Long Term Evolution (LTE) networks, wireless fidelity (WiFi), satellite, and the like. Communication network 101 may include session control capabilities such as those provided by the Internet protocol multimedia subsystem (IMS). Accordingly, the communication network 101 supports a variety of communications sessions (e.g., voice, video, text messaging, electronic mail (E-mail), instant messaging, etc.) conducted on any device, including mobile devices, capable of communicating over the network 101.

In exemplary embodiments, these communications session form the basis of many of the advanced services, applications, and content under development by service providers. To enable these features in a mobile environment, the communication network 101, for instance, ensures appropriate forwarding of data packets as the mobile user changes its network attachment point and/or technology used to gain access to the network 101. To further assist in providing these features, the communication network 101 can support multicast delivery of services, applications, and content. Multicast delivery enables distribution of information to different devices and locations as a group, without the need to send copies of the same packet individually addressed to each of the recipient devices within the group. A typical mobile user in a multicast group can generate and receive traffic that is composed of, for instance, packetized voice, interactive video, streaming voice/video, and other data components.

To ensure that an acceptable experience is provided to the user while accessing these features, each of the traffic components generally requires appropriate treatment (e.g., communication link priority, bandwidth allocation, etc.) corresponding to a predetermined class of service (e.g., quality of service (QoS) level). For a typical mobile user, application traffic is carried over multiple networks. Accordingly, the appropriate treatment to achieve the corresponding QoS is performed on each of the network elements along the path where the traffic is transported. Creating a network environment for supporting both mobility and multicast delivery represents a significant challenge when addressing network resource management.

Traditional resources and policy management systems receive information and/or query the current resources and conditions of each network, and then make decisions regarding whether a requested service can be supported. To support QoS over IP networks, traditional systems employ, for example, one of two architectures: the Integrated Services (IntServ) architecture and the Differentiated Services (DiffServ) architecture. However, these two architectures were not designed with specific support for mobility. For instance, in a mobile environment, resources associated with mobile nodes are allocated and released according to the mobility of the hosts.

Generally, the IntServ architecture uses a signaling mechanism to allocate per-flow resources between the data packet source and the corresponding destination. Because of maintenance overhead associated with maintaining the per-flow states, the IntServ architecture does not provide adequate scalability features. This lack of scalability limits implementation of the IntServ architecture to medium sized networks. On the other hand, the DiffServ architecture is positioned as a scalable solution that pushes the complexity of per flow processing to the edges of the IP networks. In the core of a network using the DiffServ architecture, differentiated service (e.g., service of differing QoS levels) is provided per traffic aggregate. However, extending the DiffServ architecture is a challenging task, considering the dynamic nature of the mobile environment. The DiffServ architecture is based on a simple model where traffic entering a network is classified and possibly conditioned at the boundaries of the network. DiffServ treatment of data packets relies on the forwarding behaviors of packets (e.g., per hop behaviors (PHBs) where each behavior aggregate is identified by a single differentiated services code point (DSCP). Depending on network policies, different types of traffic can be marked for different forwarding priorities (e.g., using different DSCP codes), and resources can be assigned according to the marking and the applicable policies.

Moreover, such traditional systems, for example, apply preconfigured rules (e.g., associate a subscriber to a particular QoS profile), but typically do not interact with the communication network 101 itself to optimize the performance of the network 101. For instance, if the current bandwidth on a link is approaching a preset threshold, a new bandwidth request is denied. Traditional systems do not try to modify the network topology or tune parameters such that a new request, which would otherwise be rejected, is accommodated. Additionally, traditional systems are not typically designed to actively interact with the communication network 101 such that real-time modifications and updates are considered to optimize the overall behavior and performance of the network.

To address this problem, the system 100 provides an active approach to management of network resources and policies as opposed to merely applying a predefined set of rules. For example, if current network conditions suggest that a new service request (e.g., a request for an allocation of network resources to provide a service) cannot be accepted because resources are not available, the system 100 considers actions to modify the network (e.g., real-time reconfiguration, topology restructuring, route manipulation, advanced notification, multi-path routing) to accommodate the request. In addition, the system 100 interacts with and takes advantage of the characteristics (e.g., hierarchical management) associated with mobile multicast protocols and supporting elements to implement an efficient distributed approach to network resource management. By capitalizing on existing elements and messages, the system 100 also supports unique functional and performance aspects of network resource management without introducing unnecessary overhead.

By way of example, the communication network 101 supports a mobile-Internet protocol (Mobile-IP) to facilitate Internet protocol-based (IP-based) communication sessions on mobile wireless devices. Mobile-IP (as described in the Internet Engineering Task Force (IETF) Request for Comments Document 3344 (RFC3344), "IP Mobility Support for IPv4," dated April 2003, incorporated herein in its entirety) is an extension to the IP protocol that enables mobile nodes (e.g., mobile hosts, wireless devices, etc.) to continue to receive data packets wherever the mobile nodes are attached to the communication network 101 (e.g., Internet). More specifically, Mobile-IP provides a protocol to enable IP hosts (e.g., hosts 109a-109n) to move between different sub-networks (e.g., wireless cells, wireless providers, service areas) without the need to tear down previously established transport layer sessions.

As shown in FIG. 1, the mobility of the hosts 109a-109n is supported by a home agent (HA) 111, one or more gateway foreign agents (GFAs) 113a-113n, and/or one or more foreign agents (FAs) 115a-115n. Under Mobile-IP, when a correspondent node (CN) 117 (e.g., a unicast source) sends a data packet to a host 109, the packet is routed through the home network of the host 109 regardless of where the host is currently attached. In the case of multicast, either the HA 111 or a FA 115 needs to join the multicast group such that it receives the multicast traffic generated by the CN 117. As used herein, the term host also refers to a mobile node (MN) or mobile host (MH). In exemplary embodiments, the host 109 is any mobile terminal, fixed terminal, or portable terminal capable of communication over the communication network 101. Examples of the communication device include a mobile smart phone, a mobile feature phone, a phone connected to a Public Switched Telephone Network (PSTN), a personal digital assistant (PDA), a personal computer (PC), as well as other like technologies and customer premises equipment (CPE).

After the CN 117 sends the data packet to the home network of the host 109, it is then the responsibility of the HA 111 within the home network of the host 109 to keep track of the current location of the host 109 and to forward the data packet from the CN 117 to the host 109. When the host 109 is away from its home network, the GFA 113 and/or the FA 115 report the location of the host 109 to the HA 111 and act as proxies for data packets forwarded to the host 109 from the HA 111. In a hierarchical mobile environment, the GFA 113 is the root FA 115 within a domain 119 of the communication network 101. In exemplary embodiments, the communication network 101 may contain multiple domains 119a-119n. For instance, each domain 119 may include a GFA 113 with one or more FAs 115 connected in a tree-like structure. Each FA 115 in turn may be connected to additional lower level FAs 115. Each GFA 113 and FA 115 may also have one or more directly connected hosts 109. Within the system 100, each of the HA 111, GFA 113, and FA 115 include, for instance, a network resource manager 121 to manage network resources and policies. Alternatively or in addition, the network resource manager 121 may be implemented in any other network element or node with connectivity to the communication network 101. The network resource manager 121 may also be implemented as a standalone node.

FIG. 2 is a diagram of the components of network resource manager, according to an exemplary embodiment. By way of example, the network resource manager 121 includes one or more modules for managing network resources and policies. In this embodiment, the network resource manager 121 includes a request module 201 to receive an allocation request for one or more resources of a network for joining a multicast group (i.e., for accessing multicast services). The allocation request can also include a corresponding QoS level for the one or more requested network resources. It is contemplated that the allocation request may originate from any network element (e.g., host 109, GFA 113, FA 115) or may be generated automatically by the request module 201 based on network traffic. For example, if the request module 201 determines that network traffic (e.g., bandwidth usage) has reached a predefined threshold, the request module 201 automatically generates an allocation request for additional resources.

The request module 201 interacts with an allocation module 203 to process the allocation request. In exemplary embodiments, the allocation module 203 determines whether the communication network 101 can accommodate the allocation request. To make this determination, the allocation module 203 compares, for instance, the requested resources against the current and maximum resource allocations available at the time of the request. To assist in making this determination, the allocation module 203 has connectivity to a database 205 of network services, a database 207 of network topology, and a database 209 of resource allocations. By way of example, the network services database 205 stores information on services available on the network (e.g., multicast services), the corresponding service providers, and associated resource requirements or components (e.g., voice, video). The network topology database 207 stores information on the available network links between network elements including permanent links and on demand links. The resource allocation database 209 stores information on current and available resource allocations associated with each service being transported over communication links within the communication network 101.

Based on the determination of whether the network can accommodate the resource allocation, the allocation module 203 can, for example, interact with the network configuration module 211 to modify the communication network 101 (e.g., in real-time) to accommodate the allocation request. In exemplary embodiments, the allocation module 203 can direct the network configuration module 211 to initiate network reconfiguration, topology restructuring, route manipulation, advanced notification, multi-path routing, or a combination thereof to modify the communication network 101. It is also contemplated that the network configuration module 211 may be configured to take any other actions available to make network resources available to accommodate the allocation request. Following successful network modification, the allocation module 203 allocates the requested network resources.

In exemplary embodiments, the allocation request may include requests for network resources to provide multicast services (e.g., IPTV, audio conferencing, video conferencing, content distribution, webcasts, distance learning applications, etc.). In this case, the network configuration module 211 may make resources available be designating one or more network elements (e.g., GFA 113, FA 115) as a local multicast service provider (LMSP). By way of example, the LMSP acts as a proxy for the requested multicast service and can be used to distribute the network traffic across additional links within the communication network 101 to make additional resources available.

The designation of the LMSP is based either on static assignment (i.e., a specific network element is designated) or on selection criteria (e.g., proximity to a multicast source, network traffic threshold—i.e., when network traffic to one previously designated LMSP reaches a predefined threshold, another LMSP may be designated). For instance, designating additional LMSPs may reduce the latency for receiving a multicast service by decreasing the number of hops that traffic associated with the service must traverse in the communication network 101. In addition, the network configuration module 211 maintains a list of designated LMSPs and their associated multicast service (i.e., LMSP mapping list) which can be stored in the network services database 205. The LMSP mapping list enables the network configuration module 211 to track network traffic to each LMSP and to balance the traffic as necessary to accommodate allocation requests (e.g., by directing traffic to a specific LMSP or by designating additional LMSPs).

As shown in FIG. 2, the network resource manager 121 also includes a mode selection module 213. The mode selection module 213 designates whether a network element (e.g., HA 111, GFA 113, FA 115) acts as either a domain policy resource manager (DPRM) or a local policy resource manager (LPRM). In exemplary embodiments, the DPRM manages network resources and policies across a domain of the network and the LPRM manages network resources and policies for network elements that are directly connected to the LPRM (e.g., directly connected hosts 109, other directly connected LPRMs). The designation of a DPRM and LPRM enables the hierarchical distribution of resource allocation tasks. For example, the LPRM responds to allocation requests from directly connected network elements and forwards the request to the DPRM, for instance, when the LPRM does not have access to sufficient network resources to accommodate the allocation request.

Figure 3A:
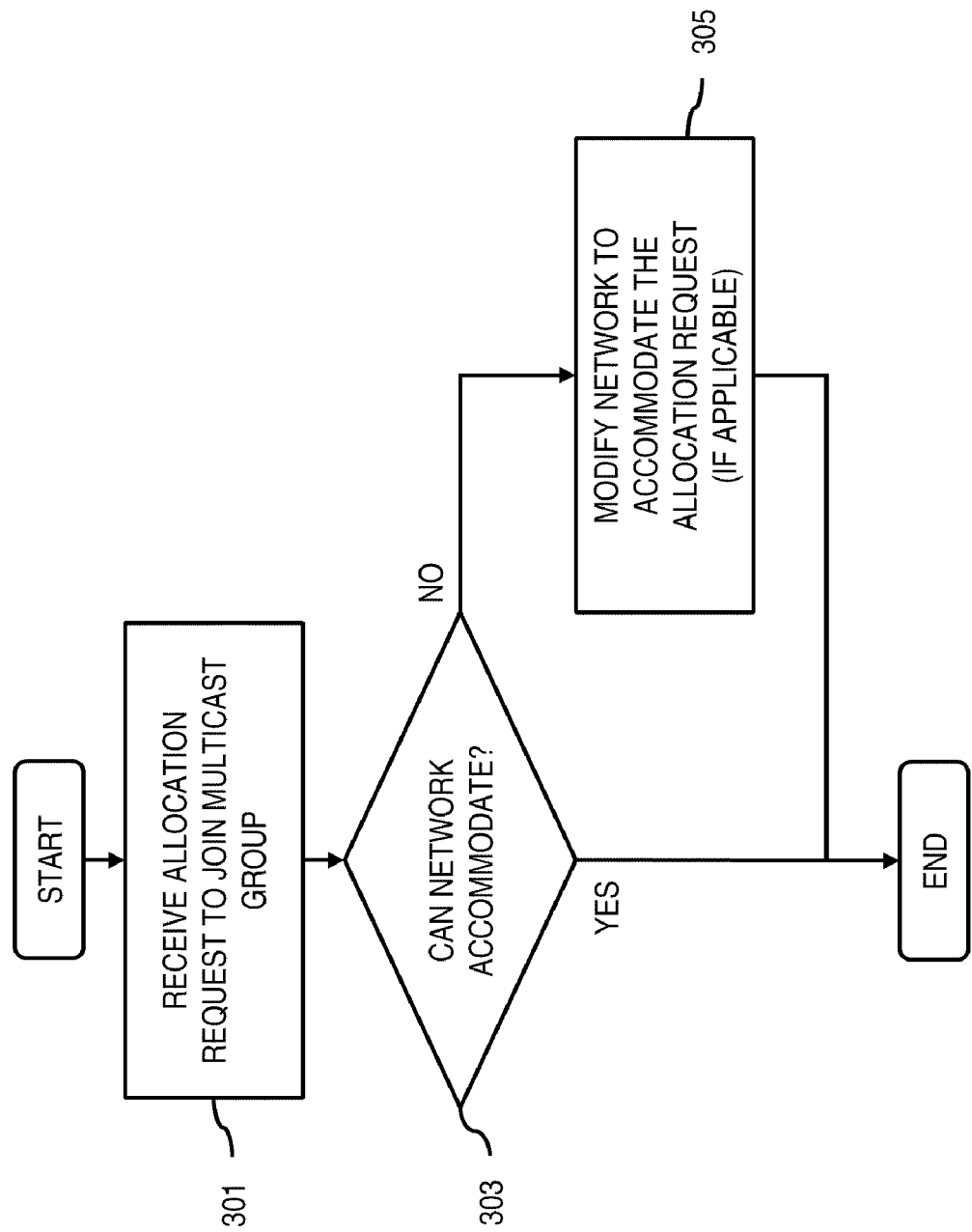
FIG. 3A is a flowchart of a process for managing network resources and policies, according to an exemplary embodiment.
Figure 3B:
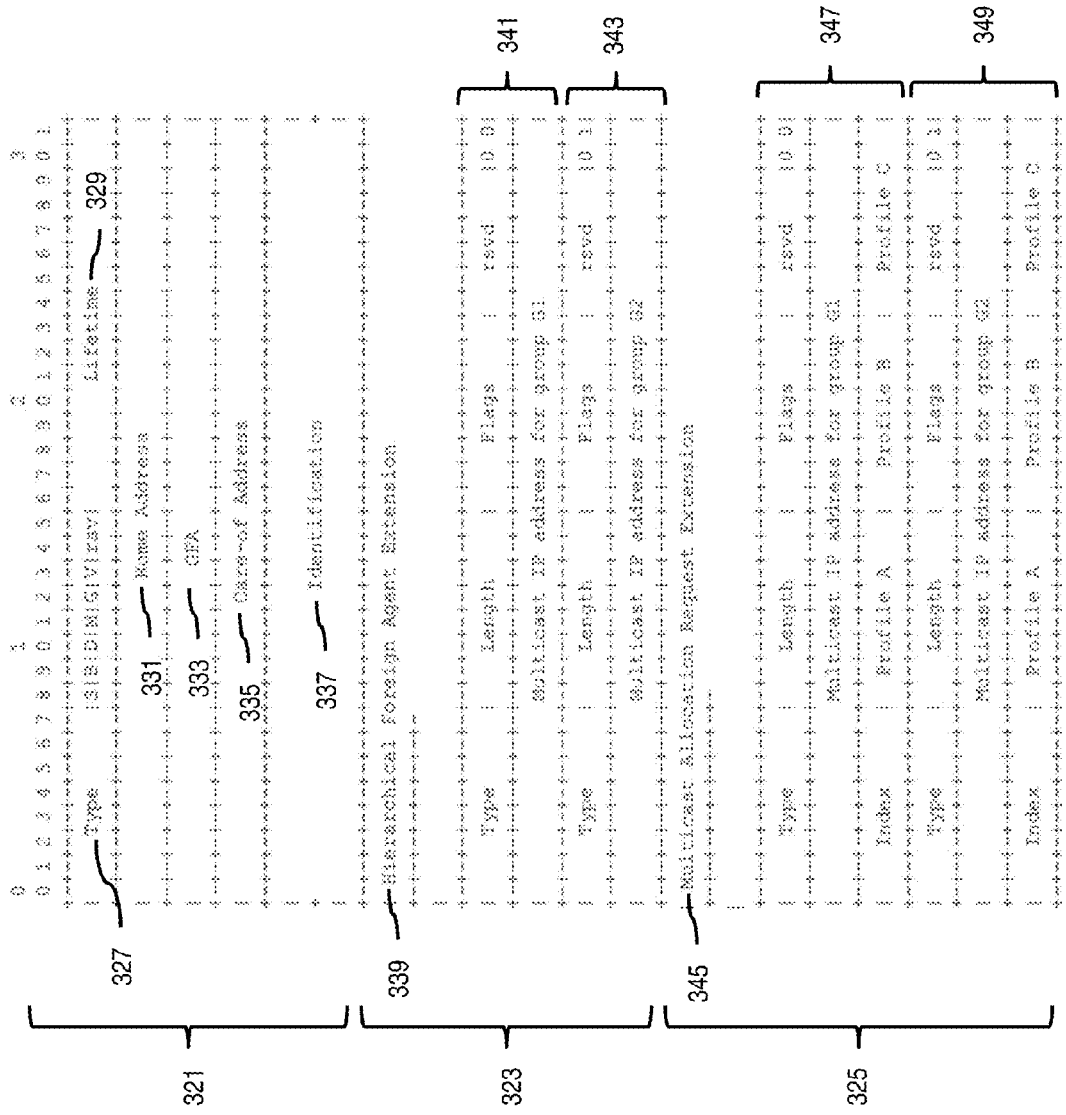
FIG. 3B is a diagram depicting a format for an allocation request, according to an exemplary embodiment.

FIG. 3A is a flowchart of a process for managing network resources and policies, according to an exemplary embodiment. The flowchart of FIG. 3A is described with respect to a FIG. 3B depicting a format for an allocation request, according to an exemplary embodiment. In step 301, the network resource manager 121 receives an allocation request, over a radio network, to join a multicast group associated with a QoS level. The requested QoS level corresponds to a level of treatment that the host 109 expects for the traffic associated with the allocation request. For example, a host 109 requests allocation of resources to join a multicast group carrying both voice and video components. The host 109 may specify that these components be provided at a high QoS level (e.g., high quality voice and video). By way of example, the allocation request may be embedded in a registration request (e.g., generated when the host 109 enters a network and identifies itself to the FA 115) or generated as a standalone message. As discussed with respect to FIG. 2, the request may be received from any network element (e.g., host 109, FA 115) or may be automatically generated by the network resource manager 121 based on network traffic.

the Mobile-IP fields of the registration request, a section 323 for the hierarchical FA extension (e.g., a membership report indicating which FAs 115 are serving a particular multicast group), and a section 325 for the multicast allocation request extension.

The fields included in the section 321 for the Mobile-IP fields are listed in the Table 1 (per RFC 3344).

TABLE 1

| Field | Description |
| --- | --- |
| "Type" field 327 | Simultaneous bindings "S" bit - If the "S" bit is set, the mobile node is requesting that the HA 111 retain its prior mobility bindings<br>Broadcast datagrams "B" bit - If the "B" bit is set, the mobile node requests that the HA 111 tunnel to it any broadcast datagrams that it receives on the home network.<br>Decapsulation by mobile node "D" bit - If the "D" bit is set, the mobile node will itself decapsulate datagrams which are sent to the care-of address (e.g., the address of the mobile node on the foreign network).<br>Minimal encapsulation "M" bit - If the "M" bit is set, the mobile node requests that its HA 111 use minimal encapsulation.<br>Generic routing encapsulation (GRE) "G" bit - If the "G" bit is set, the mobile node requests that its HA 111 use GRE encapsulation for datagrams tunneled to the mobile node.<br>"r" bit - If the "r" bit is set, a datagram is sent as zero and ignored at reception.<br>Reverse tunneling "T" bit - If the "T" bit is set, the mobile node is requesting reverse tunneling.<br>"x" bit - If the "x" bit is set, a datagram is sent as zero and ignored at reception. |
| "Lifetime" field 329 | The number of seconds remaining before the registration is considered expired. A value of zero indicates a request for deregistration. A value of 0xffff indicates infinity. |
| "Home Address" field 331 | The IP address of the mobile node. |
| "GFA" field 333 | The IP address of the mobile node's GFA 113. |
| "Care-of-address" field 335 | The IP address for the end of the tunnel. |
| "Identification" field 337 | A 64-bit number, constructed by the mobile node, used for matching registration requests with registration replies. |

The network resource manager 121 then determines whether the network can accommodate the allocation request (step 303). For example, the network resource manager 121 determines whether there are sufficient network resources (e.g., communication links, bandwidth) to support the services corresponding to the requested multicast group (step 303). In exemplary embodiments, the network resource manager 121 makes this determination by inspecting the current network topology and available network resources (e.g., current and available allocated bandwidth). If the communication network 101 cannot accommodate the allocation request, the network resource manager 121 modifies the network to accommodate the allocation request based on the determination by, for instance, modifying the LMSP mapping list (step 305). These modifications may also include network reconfiguration, topology restructuring, route manipulation, advanced notification, multi-path routing, or a combination thereof. Other options include manipulating packet forwarding paths within the mobility domain, activating/creating on-demand paths, utilizing marking and queuing mechanism to manipulate packet forwarding priority, and the like.

FIG. 3B is a diagram depicting a format for an allocation request, according to an exemplary embodiment. By way of example, the allocation request may be included in a registration request as defined in RFC 3344. More specifically, the allocation request and accompanying membership report can be implemented as extensions to the registration message (e.g., a Mobile-IP message) following the guidelines in RFC 3344. As shown in FIG. 3B, an exemplary format for an allocation request includes three sections: a section 321 for Section 323 for the hierarchical FA extension is used, for instance, to provide a membership report of the multicast group or groups served by the FA 115. Section 323 includes multiple fields 339 identifying the extension, and one or more fields associated with a multicast group (e.g., field 341 for designating the IP address of a multicast group G1, and field 343 for designating the IP address of a multicast group G2). Each field is characterized by type, length (e.g., in bytes), and associated flags.

Section 325 for the multicast allocation request extension is used to request resources for joining one or more multicast groups. Section 325 includes a field 345 identifying the extension, and one or more fields specifying an allocation request (e.g., field 347 specifying an allocation request for joining multicast group G1, and field 349 specifying an allocation request for joining multicast group G2). Each field is characterized by type, length (e.g., in bytes), associated flags, and a requested QoS level (e.g., expressed as a QoS index and QoS profiles A-C).

Figure 4:
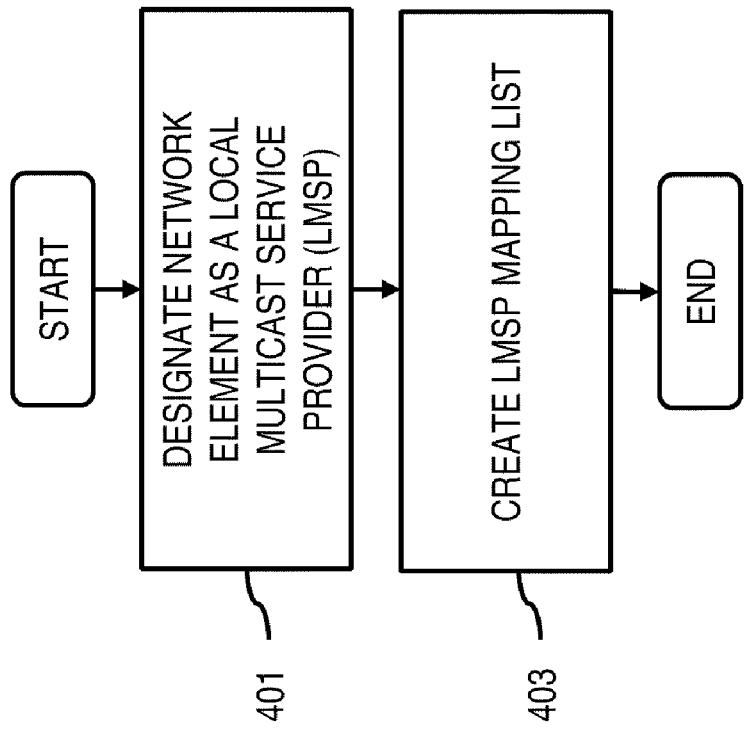
FIG. 4 is a flowchart of a process for managing resources for joining a multicast group, according to an exemplary embodiment.

FIG. 4 is a flowchart of a process for managing resources for joining a multicast group, according to an exemplary embodiment. In step 401, the network resource manager 121 designates one or more network elements (e.g., HA 111, GFA 113, FA 115) to act as an LMSP for a multicast service. In exemplary embodiments, the LMSP acts as a proxy for the multicast service (step 403). More specifically, the LMSP subscribes to a multicast service on behalf other network elements (e.g., host 109) and then forwards traffic from the multicast service directly to the other network elements or through other intermediate nodes. For example, when a host 109 is interested in a multicast service, the host 109 sends an allocation request for the service over the communication network 101. As the request travels over the communication network 101 through intermediate nodes (e.g., FA 115), each intermediate node inspects the request and processes it accordingly. If the intermediate node has been designated as an LMSP for the requested multicast service and is already receiving the multicast service, the LMSP forwards the multicast service to the host 109, and the request is not forwarded any further in the network. In certain embodiments, it is contemplated that if the request for the multicast service travels a predetermined number of hops between nodes without being intercepted by an LMSP, the network configuration module 211 can designate a network element in the path of the request to act as the LMSP for the requested multicast service.

As the network resource manager 121 designates one or more LMSPs, the network resource manager 121 creates and updates the LMSP mapping list that records designated LMSPs and their associated multicast services (step 405). By way of example, the network resource manager 121 may include an initial list of network elements acting as LMSPs. Based on network traffic and/or allocation requests, the network resource manager 121 modifies and updates the LMSP mapping list to accommodate allocation requests. The decision to modify the LMSP mapping list is driven, for instance, by the characteristics and dynamics associated with the multicast mobile environment (e.g., mobility patterns, density of mobile users, number of requested multicast groups, resources associated with each group, requested QoS, available network elements, and communication link capacities).

Figure 5:
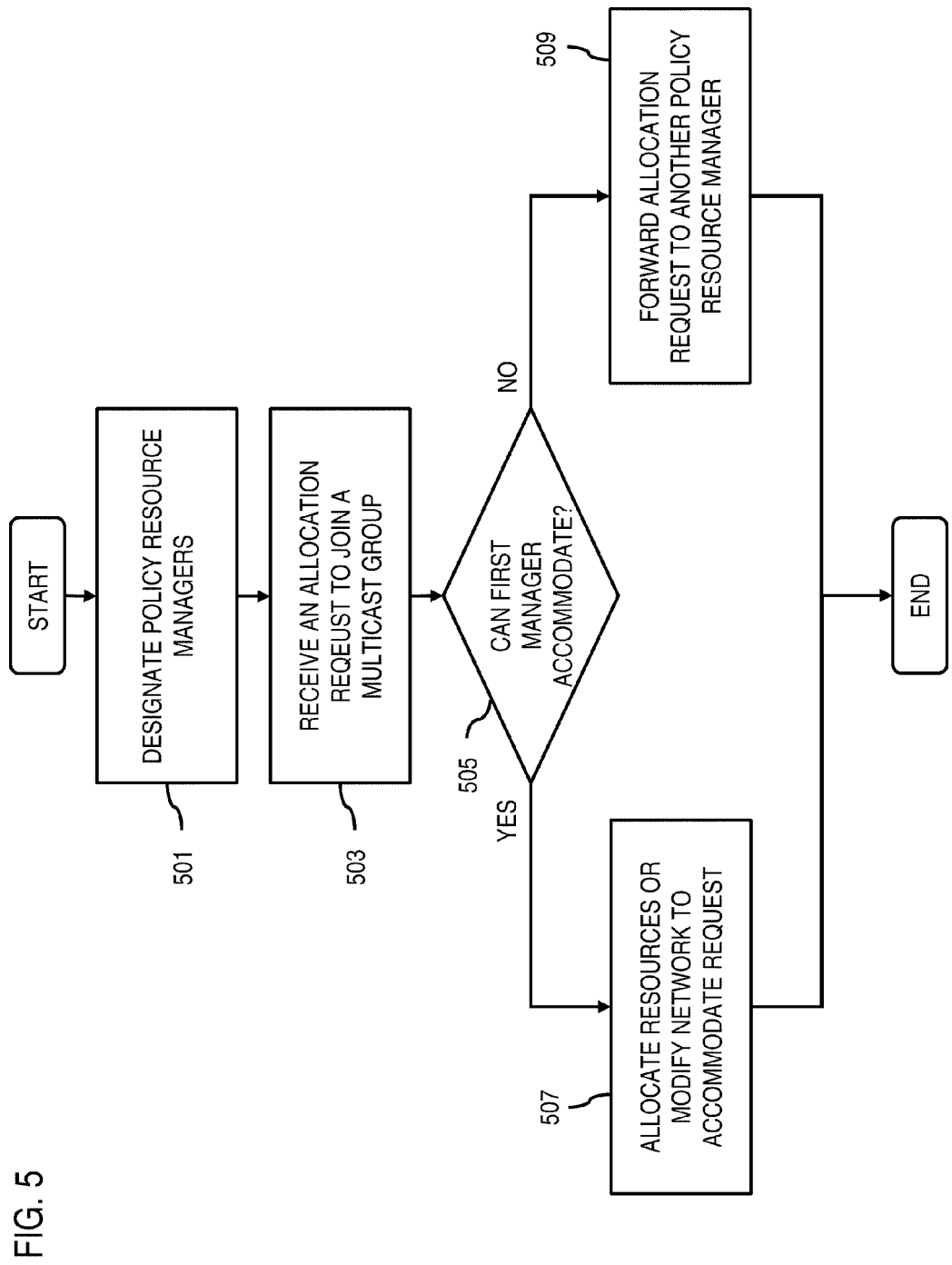
FIG. 5 is a flowchart of a process for managing network resources and policies using a hierarchical approach, according to an exemplary embodiment.

FIG. 5 is a flowchart of a process for managing network resources and policies using a hierarchical approach, according to an exemplary embodiment. In exemplary embodiments, the network resource manager 121 may employ a hierarchical approach to managing network resources and policies. For example, as described with respect to FIG. 1, the communication network 101 may include multiple domains 119. In turn, each domain includes a GFA 113 and one or more subordinate FAs 115. Each FA 115 may also be connected to additional lower level FAs 115 and/or to one or more hosts 109. Reflecting the branching hierarchy of network elements, the network resource manager 121 designates a network element (e.g., GFA 113, FA 115) within this hierarchy to act as a policy resource manager (e.g., a DPRM or a LPRM) with control over at least a portion of the network resources (step 501). For example, a higher level policy resource manager (e.g., a DPRM) with connectivity to additional policy resource managers may manage and control resources across a domain of the communication network 101. The GFA 113, as the root FA 115 within a domain 119, is generally a good candidate to be designated as the DPRM. Other policy resource managers (e.g., a LPRM) manage network resources for one or more directly connected network elements. In exemplary embodiments FAs 115 are typically designated as LPRMs. Typically a communication network 105 may have multiple policy resource managers (e.g., DPRMs and LPRMs).

Next, the policy resource manager receives an allocation request from a host 109 (step 503). The policy resource manager then determines whether it has sufficient network resources to accommodate the allocation request (step 505). In exemplary embodiments, the policy resource manager holds information regarding available and currently allocated network resources. If the policy resource manager determines that it can accommodate the request without intervention from other policy resource managers, the policy resource manager allocates the requested resources or modifies the network to allocate the resources as described with respect to FIG. 3A (step 507). If the policy resource manager cannot accommodate the request, the policy resource manager forwards the allocation request to another policy resource manager (e.g., a higher level policy resource manager such as a DPRM) within the communication network 101 hierarchy for processing (step 509). For example, the DPRM manages the allocation request using resources available across a domain 119 of the communication network 101 (step 511). In exemplary embodiments, the DPRM holds a global view of the topology of the network domain and the currently allocated resources. Correspondingly, the DPRM has access to more network resources and potential options to modify the communication network 101 to accommodate the allocation request than the LPRM.

Figure 6:
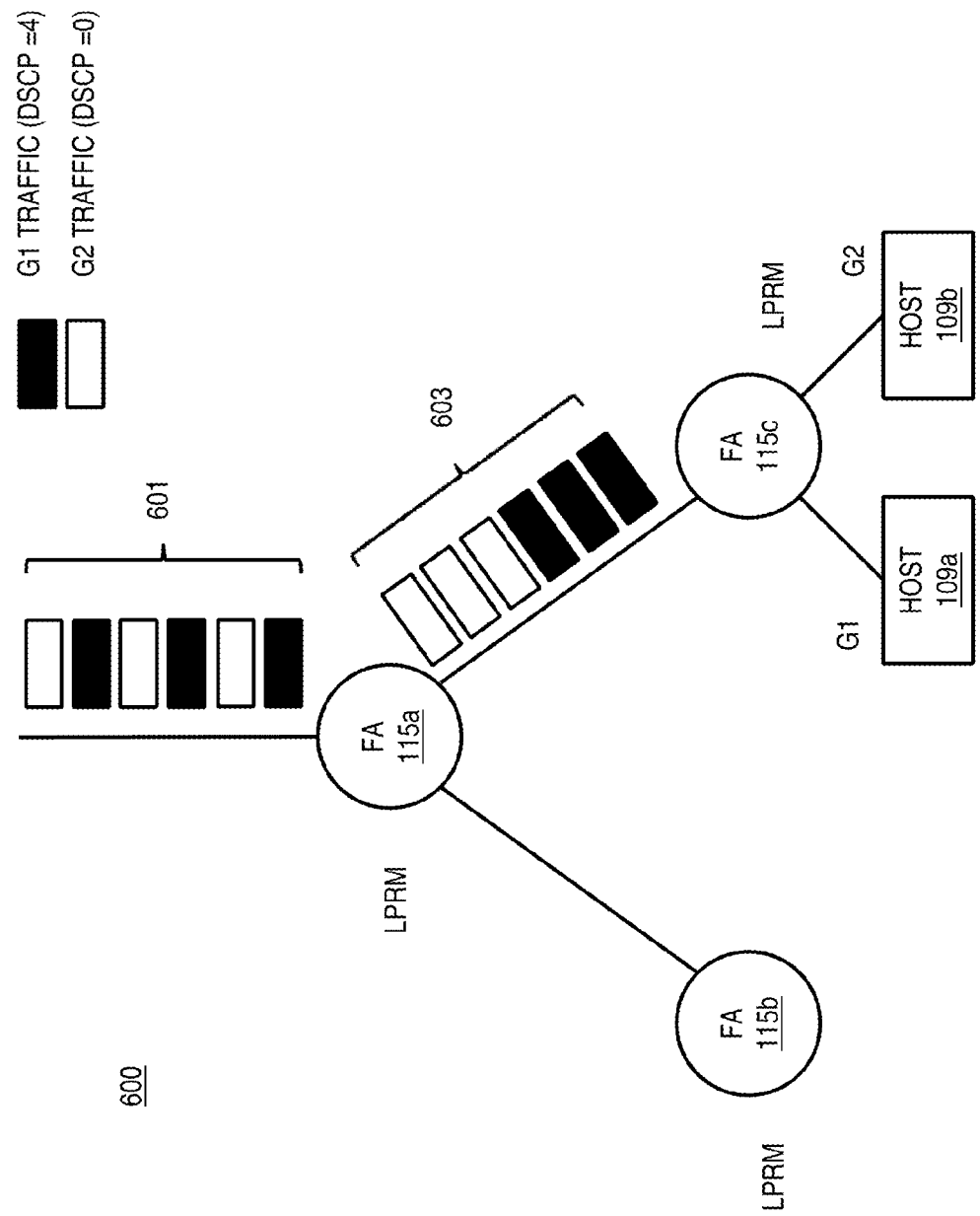
FIG. 6 is a diagram depicting the use of a local policy resource manager (LPRM) to manage network resources, according to an exemplary embodiment.

FIG. 6 is a diagram depicting the use of a local policy resource manager (LPRM) to manage network resources, according to an exemplary embodiment. In exemplary embodiments, the LPRM manages network resources associated with directly connected network elements for both the upward and downward directions. For example, FA 115a has a communication link to each of two FAs (i.e., FA 115b and FA 115c) on lower levels of the network hierarchy and manages the capacity and current allocations associated with each link. All three FAs 115a-115c, for instance, are designated as LPRMs. As shown in FIG. 6, a multicast stream 601 includes traffic from a first multicast group (G1) and a second multicast group (G2). In the example 600, the G1 data traffic has a higher QoS class (e.g., DSCP=4) than the G2 data traffic (e.g., DSCP=0). With respect to the FAs 115a-115c, the multicast stream 601 is directed over the communication link between FA 115a and FA 115c to the hosts 109a (subscribed to G1) and host 109b (subscribed to G2) as a multicast stream 603.

By way of example, FA 115c acts as the LPRM for hosts 109a and 109b to deliver the multicast traffic for G1 and G2 to the respective hosts 109a and 109b according to the requested QoS. The FA 115c can use, for instance, queuing and congestion management mechanisms (e.g., weighted random early discard) to prioritize G1 traffic over G2 traffic in the multicast stream 603 between FA 115a and FA 115c. Moreover, because LPRMs manage resources independently on both the inward and outward directions, separate queuing, rate limiting, and shaping techniques can be used for each direction. In addition, marking techniques can be used to classify and reclassify traffic according to configured rules to achieve the requested QoS. As shown in FIG. 6, the data packets associated with G1 are prioritized over the traffic for G2 in the multicast stream 603.

Figure 7:
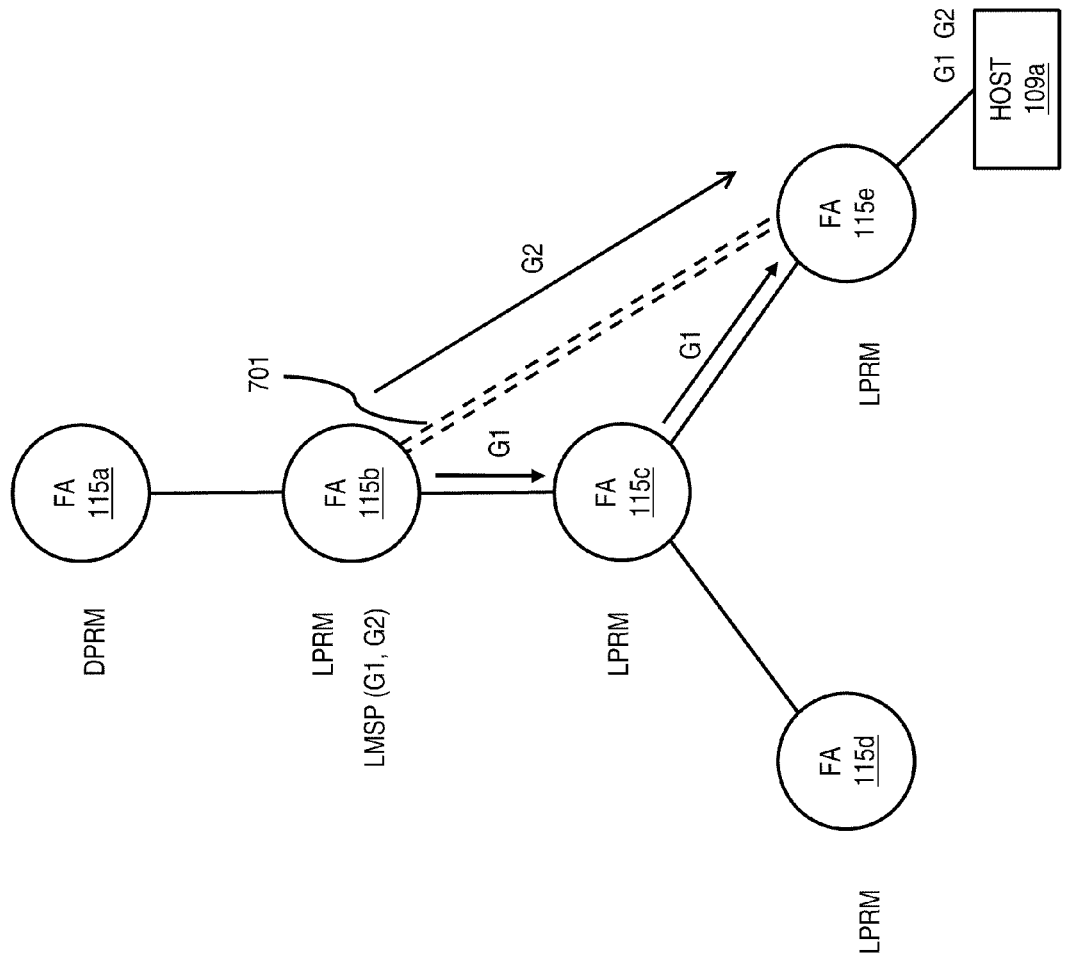
FIG. 7 is a diagram depicting the use of a domain policy resource manager (DPRM) to manage network resources, according to an exemplary embodiment.

FIG. 7 is a diagram depicting the use of a domain policy resource manager (DPRM) to manage network resources, according to an exemplary embodiment. While the LPRM has a view of the directly connected network elements and corresponding resource allocations, the DPRM has a complete picture of the network topology and the corresponding resource allocations across the domain 119. In addition, the DPRM continually updates its detailed view of the domain 119 by, for instance, receiving updates from the attached LPRMs when the network infrastructure is modified or updated. As shown in FIG. 7, FA 115a is designated as the DPRM and FAs 115b-115e are designated as LPRMs. In addition, FA 115b is designated as the LMSP for both the G1 and G2 multicast service.

In this example, a host 109a is receiving a multicast stream G1 through the path FA 115b-FA 115C-FA 115e. At some point, the host 109 generates a registration request including an allocation request for receiving a multicast stream G2 with a premium level of QoS (e.g., 100 Mbps of DSCP=5). Although FA 115*b* acts as the LMSP for G2, the FA 115*e* (as the LPRM for host 109*a*) determines that the communication link over the path FA 115*b*-FA 115C-FA 115*e* cannot support the allocation request for G2. Accordingly, the allocation request is forwarded to FA 115*a* the DPRM at FA 115*a*. Upon receiving the forwarded allocation request, the DPRM refers to its database 207 of network topology and database 209 of resource allocations to determine whether the allocation request can be accommodated. If not, the DPRM determines whether the allocation request can be accommodated by modifying the communication network 101. In this case, the DPRM determines that the communication network 101 can be modified to accommodate the allocation request by creating an on-demand communication link 701 between the G2 LMSP at FA 115*b* and the LPRM at FA 115*e* serving the host 109*a*.

By way of example, to establish the on-demand link 701, the DPRM generates provisioning instructions to FA 115*b* and FA 115*e* (depending on the topology and the technology used in the network 101, it is contemplated that additional elements between FA 115*b* and 115*e* may be provisioned as well). In establishing the link 701, the DPRM also identifies the appropriate QoS (e.g., 100 Mbps of DSCP=5) and selects the appropriate QoS profiles corresponding to the network configuration (e.g., queuing/marking configuration, etc.) to achieve the requested QoS.

In certain embodiments, it is contemplated that the DPRM can manipulate the LMSP mapping list to accommodate the allocation request. For instance, the identity of the FA 115 acting as the LMSP for a particular multicast service can affect the resource allocation (and therefore the QoS level) that can be provided when forwarding traffic to a particular host 109. Generally, a particular LMSP that is closer to the multicast source and/or the receiving FA 115 may help achieve a lower delay value and, therefore, a higher QoS level. Selecting an LMSP that is handling a single or fewer multicast services also can enhance the ability to support higher QoS levels as compared to another LMSP that is already handling a large number of multicast services.

It is also contemplated that resource allocations (e.g., allocations for resources associated with multicast services) may span across multiple domains 119 within the communication network 101. In this case, the DPRM may, for instance, negotiate the QoS profile for resources from an external domain 119. Alternatively or in addition, the LMSP may identify and compile the QoS profile or QoS metrics from the network traffic transporting the multicast service from an external domain 119.

Figure 8:
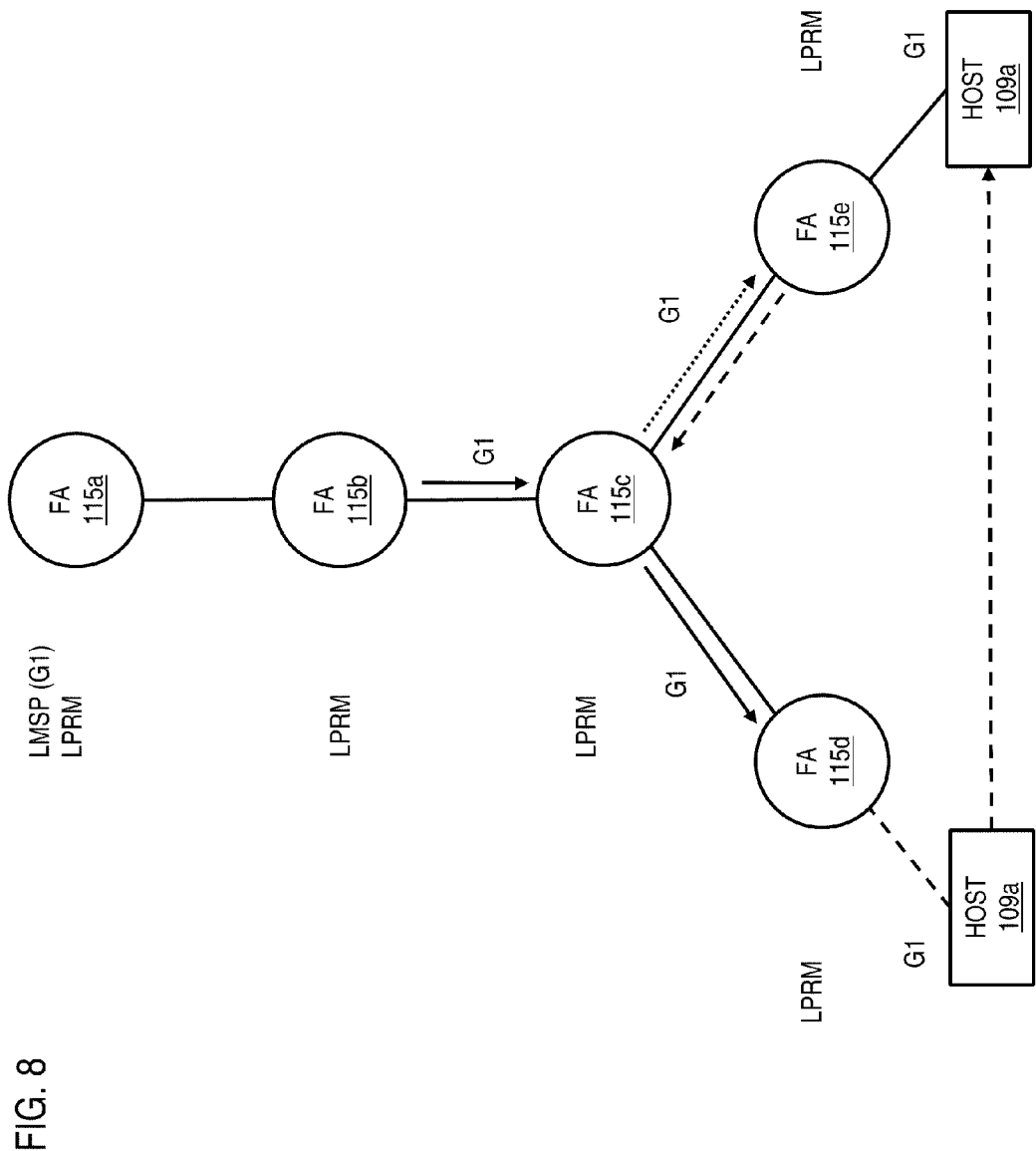
FIG. 8 is a diagram depicting the management of network resources in response to a mobility event, according to an exemplary embodiment.

FIG. 8 is a diagram depicting the management of network resources in response to a mobility event, according to an exemplary embodiment. In exemplary embodiments, the LPRM handles most mobility events (e.g., a host 109 moving from one service area to another) and involves the DPRM only as needed. As shown in FIG. 8, a host 109*a* moves from the LPRM at FA 115*d* to the LPRM at FA 115*e*. At the same time, the host 109*a* is already receiving a multicast stream G1. Before the mobility event, the FA 115*a* which is acting as the LMSP for G1 is forwarding the multicast stream G1 through the path FA 115*b*-FA 115*c*-FA 115*d*. After the mobility event, the multicast stream G1 follows the path FA 115*b*-FA 115*c*-FA 115*e*. As part of the move, the host 109*a* generates a registration request including an allocation request for G1 when it enters the service area supported by the LPRM at FA 115*e*. Because both the LPRM at FA 115*d* and the LPRM at FA 115*e* are served by the LPRM at FA 115*c* that is already receiving the multicast stream G1, the LPRM at FA 115*c* can serve the allocation request and need not forward the request further up the network hierarchy. The LPRM at FA 115*c* verifies that the resources are available over the communication link between FA 115*c* and FA 115*e*, and allocates the resources accordingly. After allocation of the resources, the multicast stream can flow towards the host 109*a* through its attachment point to FA 115*e*, thereby enabling the host 109*a* to continue to receive the multicast stream G1 after its mobility event with minimum disruption.

Figure 9:
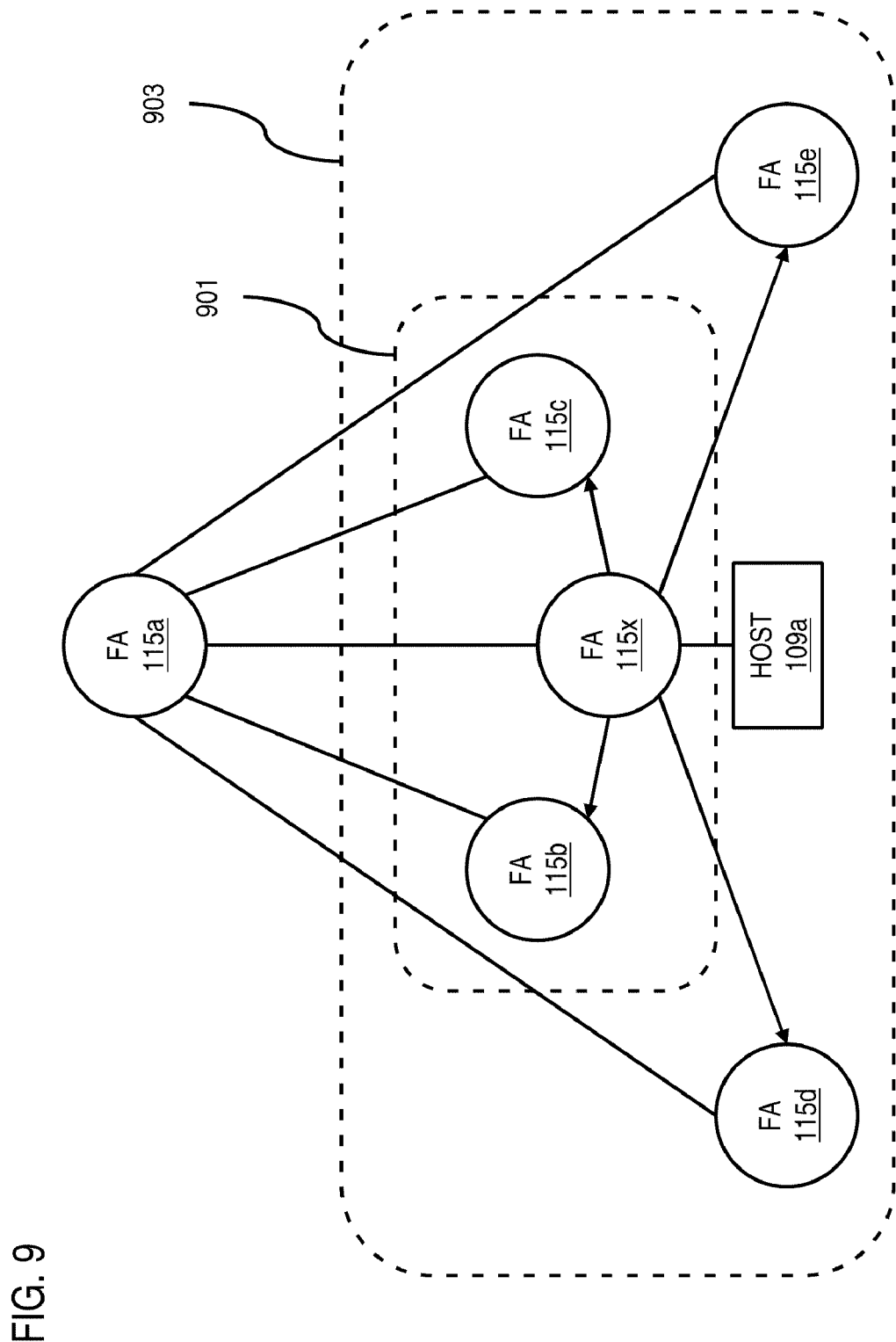
FIG. 9 is a diagram depicting the use of advanced notification in response to a mobility event, according to an exemplary embodiment.

FIG. 9 is a diagram depicting the use of advanced notification in response to a mobility event, according to an exemplary embodiment. To reduce or eliminate traffic loss associated with mobility events, the LPRM can proactively identify neighboring FAs 115 (e.g., FAs 115 in close proximity to the FA 115 currently serving the host 109*a* before the mobility event). For example, the neighboring list includes those FAs 115 that the host 109*a* is likely to relocate to upon its next move. The network resource manager 121 considers forwarding multicast traffic with the intended QoS profile to the FAs 115 on the neighboring list such that the next FA 115 is already receiving the traffic upon the arrival of the mobile host 109*a*. The neighboring list is dynamic and updated based on the mobility pattern on the host 109*a*. In exemplary embodiments, the neighborhood scope is configurable to accommodate different QoS levels. For instance, to achieve a medium QoS level, the list may contain two possible neighboring FAs 115. To achieve a high QoS level, the list may contain four possible neighboring FAs 115. As shown in FIG. 9, the neighboring list 901 includes two possible neighbors: FAs 115*b* and 115*c* to achieve a medium QoS level. The neighboring list 903 includes four possible neighbors: FAs 115*b*-115*e* to achieve a high QoS level. FIG. 9 depicts FA 115*a* forwarding a multicast stream to each of the FAs 115*b*-115*e* according to the neighboring lists 901 and 903. It is noted that increasing the number of neighbors also increases the network resource allocations required to support the advanced notification of FAs 115 on the list because the same multicast stream is transmitted to all neighboring FAs 115.

Figure 10:
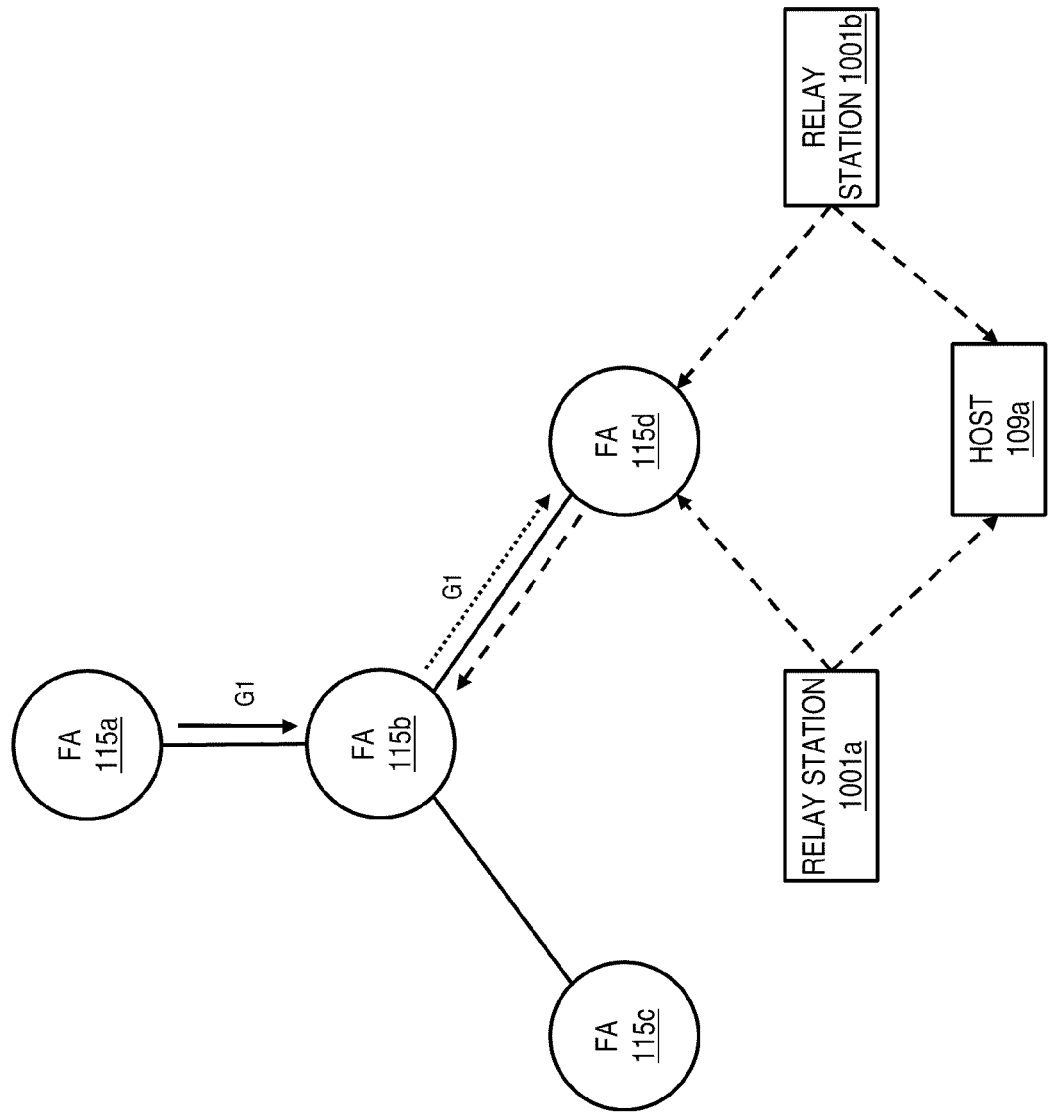
FIG. 10 is a diagram depicting the management of network resources using multipath routing, according to an exemplary embodiment.

FIG. 10 is a diagram depicting the management of network resources using multipath routing, according to an exemplary embodiment. The system of FIG. 10 includes FAs 115*a*-115*d* with FA 115*a* forwarding a multicast stream G1 through the path FA 115*a*-FA 115*b*-FA 115*d*. In previous examples, network resource allocations are discussed with respect to a single path for delivering multicast data from FA 115*d* to the attached host 109*a*. In exemplary embodiments, it is contemplated that multiple transmission paths may be used to forward data from FA 115*d* to host 109*a*. For instance, one transmission path may occur from FA 115*d* to host 109*a* through a first relay station 1001*a*, and another transmission path may occur through a second relay station 1001*b*. When enabled, multiple path transmission provides better error-handling characteristics over the transmission segment between FA 115*d* and 109*a*, thereby enabling higher QoS levels. It is contemplated that the multiple path feature can be explicitly requested or specified by the appropriate QoS profile. In the example of FIG. 10, a single path between FA 115*d* and host 109*a* may not achieve the requested QoS metric of less than 0.01% packet loss. Using multiple paths, however, (e.g., through relay stations 1001*a* and 1001*b*) may permit the network 101 to achieve the requested QoS metric.

The processes described herein for managing network resources and policies may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 11:
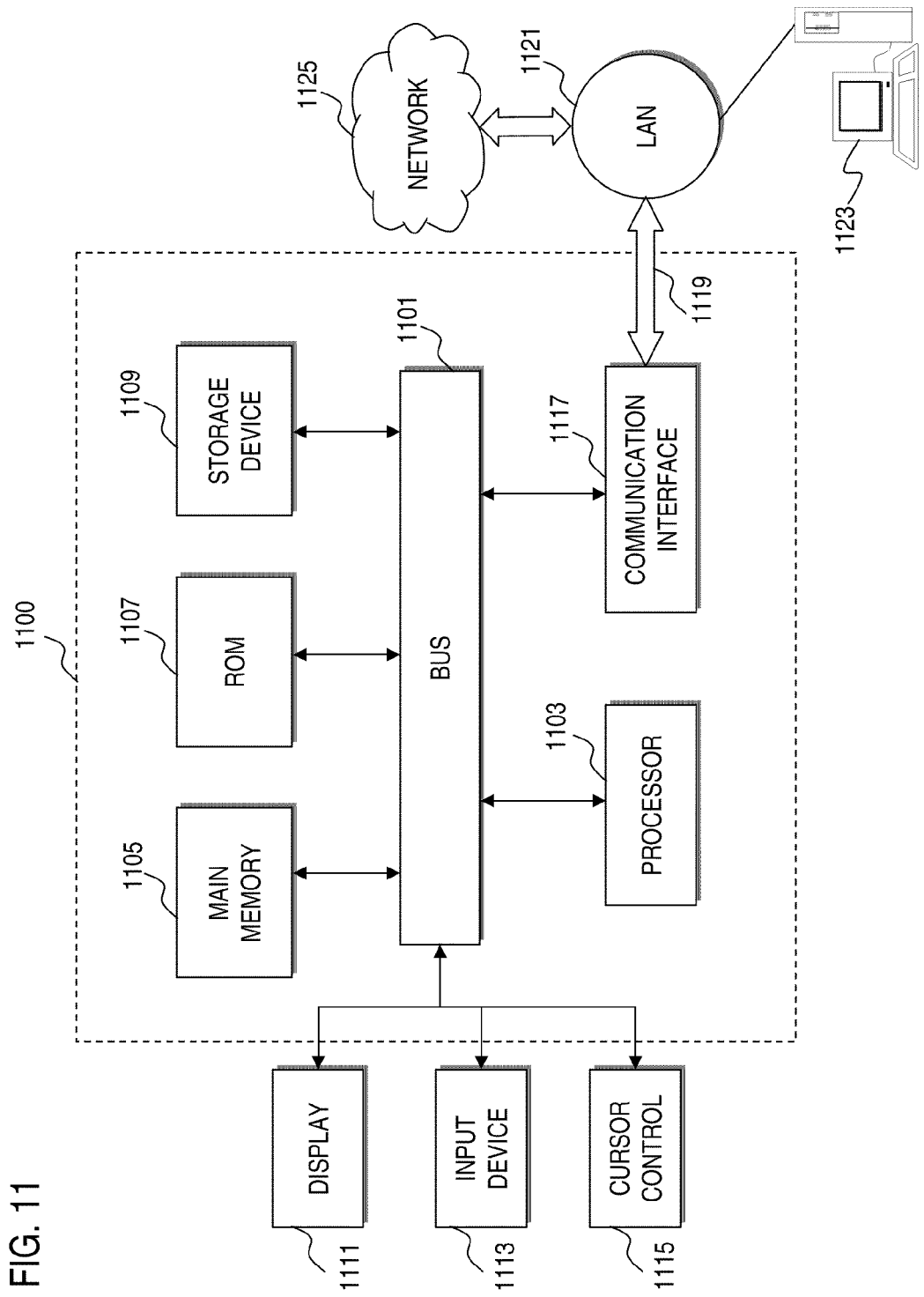
FIG. 11 is a diagram of a computer system that can be used to implement various exemplary embodiments.

FIG. 11 illustrates computing hardware (e.g., computer system) upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving an allocation request, over a radio network, to join one of a plurality of multicast groups, the one multicast group being associated with a quality of service (QoS) level;
   designating one or more network elements of the radio network to act as a policy resource manager;
   determining whether a first policy resource manager can accommodate the allocation request;
   forwarding the allocation request to a second policy resource manager based on the determination, wherein the second policy resource manager has access to more resources of the network than the first policy resource manager;
   determining whether the network can accommodate the allocation request; and
   modifying the network to accommodate the allocation request based on the determination by modifying a local multicast service provider (LMSP) mapping list that associates, respectively, one or more LMSPs with the multicast groups.

2. A method of claim 1, wherein the multicast group provides a service including Internet protocol television (IPTV), audio conferencing, video conferencing, content distribution, webcasts, distance learning applications, or a combination thereof.

3. A method of claim 1, further comprising:
   designating one or more network elements of the radio network as a local multicast service provider (LMSP).

4. A method of claim 3, wherein the designation of the one or more local multicast service providers (LMSPs) is based either on assignment or on application of selection criteria.

5. A method of claim 1, wherein the allocation request is automatically generated based on network traffic.

6. A method of claim 1, wherein the step of modifying the network includes network reconfiguration, topology restructuring, route manipulation, advanced notification, multi-path routing, or a combination thereof.

7. An apparatus comprising:
   a communication interface configured to receive an allocation request, over a radio network, to join one of a plurality of multicast groups, the one multicast group being associated with a quality of service (QoS) level; and
   a processor configured as a network resource manager to determine whether a network can accommodate the allocation request and to modify the network to accommodate the allocation request based on the determination by modifying a local multicast service provider (LMSP) mapping list that associates, respectively, one or more LMSPs with the multicast groups,
   wherein the processor is further configured to designate one or more network elements of the radio network to act as a policy resource manager, to determine whether a first policy resource manager can accommodate the allocation request, and to forward the allocation request to a second policy resource manager based on the determination,
   wherein the second policy resource manager has access to more resources of the network than the first policy resource manager.

8. An apparatus of claim 7, wherein the multicast group provides a service including Internet protocol television (IPTV), audio conferencing, video conferencing, content distribution, webcasts, distance learning applications, or a combination thereof.

9. An apparatus of claim 7, wherein the processor is further configured to designate one or more network elements of the radio network as a local multicast service provider (LMSP).

10. An apparatus of claim 9, wherein the designation of the one or more local multicast service providers (LMSPs) is based either on assignment or on application of selection criteria.

11. An apparatus of claim 7, wherein the allocation request is automatically generated based on network traffic.

12. An apparatus of claim 7, wherein the modification of the network includes network reconfiguration, topology restructuring, route manipulation, advanced notification, multi-path routing, or a combination thereof.

13. An apparatus of claim 7, wherein the apparatus is a home agent (HA), foreign agent (FA), or gateway foreign agent (GFA) within a Mobile-Internet Protocol (Mobile-IP) network.

14. A system comprising:
   a network resource manager configured to receive an allocation request for one or more network resources, over a radio network, to join one of a plurality of multicast groups, the one multicast group being associated with a quality of service (QoS) level,
   wherein the network resource manager is further configured to determine whether a network can accommodate the allocation request, and to modify the network to accommodate the allocation request based on the determination by modifying a local multicast service provider (LMSP) mapping list that associates, respectively, one or more LMSPs with the multicast groups; and
   a plurality of policy resource managers each configured to manage network resources and policies for network elements of the radio network,
   wherein the network resource manager is further configured to determine whether a first one of the policy resource managers can accommodate the allocation request, and to forward the allocation request to a second one of the policy resource managers based on the determination,
   wherein the second one of the policy resource managers has access to more resources of the network than the first one of the policy resource managers.

15. A system of claim 14, wherein the network resource manager is further configured to designate one or more network elements as a local multicast service provider (LMSP) and to create the LMSP mapping list.

* * * * *